(12) United States Patent
Yu

(10) Patent No.: US 10,762,739 B2
(45) Date of Patent: Sep. 1, 2020

(54) STORAGE DEVICE, FOOD VENDING MACHINE WITH THE SAME, AND FOOD-SERVING METHOD

(71) Applicant: Pen Chun Yu, Hualien (TW)

(72) Inventor: Pen Chun Yu, Hualien (TW)

(*) Notice: Subject to any disclaimer, the term of this patent is extended or adjusted under 35 U.S.C. 154(b) by 477 days.

(21) Appl. No.: 15/670,469

(22) Filed: Aug. 7, 2017

(65) Prior Publication Data
US 2019/0043301 A1    Feb. 7, 2019

(51) Int. Cl.
| G07F 17/00 | (2006.01) |
| G07F 9/10 | (2006.01) |
| H05B 6/12 | (2006.01) |
| H05B 6/80 | (2006.01) |
| A23L 5/30 | (2016.01) |
| H05B 6/00 | (2006.01) |

(52) U.S. Cl.
CPC ............ G07F 17/0078 (2013.01); A23L 5/30 (2016.08); G07F 9/105 (2013.01); H05B 6/129 (2013.01); H05B 6/808 (2013.01); G07F 17/00 (2013.01); H05B 6/00 (2013.01)

(58) Field of Classification Search
CPC ...... G07F 17/0078; G07F 9/105; G07F 17/00; H05B 6/129; H05B 6/808; H05B 6/00; A23L 5/30
USPC ................................................. 700/231–244
See application file for complete search history.

(56) References Cited

U.S. PATENT DOCUMENTS

| 4,438,683 A * | 3/1984 | Bartfield ............. A47J 37/1228 221/150 A |
| 4,482,078 A * | 11/1984 | Reiss ...................... G07F 9/105 221/150 A |
| 5,799,822 A * | 9/1998 | Rudewicz ............... G07F 9/026 219/678 |
| 10,510,204 B2 * | 12/2019 | Castellano .......... A47J 41/0044 |
| 2012/0185086 A1 * | 7/2012 | Khatchadourian ...... A21D 8/02 700/233 |
| 2016/0376102 A1 * | 12/2016 | Cook, II ................. G07F 11/62 414/281 |
| 2017/0014785 A1 * | 1/2017 | Childers ................. B01F 7/161 |
| 2019/0051088 A1 * | 2/2019 | Treadwell ................. A47F 1/12 |

* cited by examiner

*Primary Examiner* — Michael Collins
(74) *Attorney, Agent, or Firm* — Muncy, Geissler, Olds & Lowe, P.C.

(57) ABSTRACT

A food vending machine has a food-preparing device and a storage device. The storage device is connected with the food-preparing device and has serving openings and a transmission mechanism. The transmission mechanism has multiple loading assemblies capable of moving along a transmission route. A food-serving method includes an ordering process, a preparing process, and a serving process. A consumer may choose later pick-up and optionally specify a pick-up time. Then, if the consumer chooses later pick-up but does not specify a pick-up time, the storage device serves the meal; if the consumer chooses later pick-up and specifies a pick-up time, the food-preparing device serves the meal, but the meal will be conveyed to the storage device after a pre-set time. Thus, a waiting time of the consumer may be reduced, and a formerly ordered but not-yet-picked-up meal may not interfere with a later consumer.

18 Claims, 10 Drawing Sheets

STORAGE DEVICE, FOOD VENDING MACHINE WITH THE SAME, AND FOOD-SERVING METHOD

BACKGROUND OF THE INVENTION

1. Field of the Invention

The present invention relates to a storage device, a food vending machine with the same, and a food-serving method.

2. Description of the Prior Arts

One of the conventional food vending machines is capable of preparing and serving food products. Said conventional food vending machine processes food materials and ingredients inside the conventional food vending machine and then produces and dispenses packaged or boxed food products so that consumers can get a cooked/heated meal. However, it takes a lot of time for preparing a meal, the consumer has to wait near the food vending machine until the meal is served, and the consumer has to take out the meal immediately, which prevents other consumers from taking the meal or avoids the purchased meal from being wrongly taken by others. Besides, it takes more time when the meal requires more complicated cooking, heating, or any other preparation, which makes people lose patience and then leave temporarily for other errands. If some people leaving the food vending machine temporarily do not get back in time, the aforesaid problems occur.

In addition, some food vending machines can take orders online or remotely, and the consumer can specify a pick-up time before hand, so the consumer arrives at the food vending machine and picks up the meal when the specified pick-up time approaches. However, when the specified pick-up time has elapsed but the consumer arrives late, the meal is put in a serving opening of the food vending machine and therefore obstructs other consumers from picking up their meals.

To overcome the shortcomings, the present invention provides a storage device, a food vending machine with the storage device, and a food-serving method to mitigate or obviate the aforementioned problems.

SUMMARY OF THE INVENTION

The main objective of the present invention is to provide a storage device, a food vending machine with the storage device, and a food-serving method and thereby food products may be reserved for pick-up.

The storage device for a food vending machine has a case, and a driving mechanism. The case comprises an entrance, at least one serving opening, and at least one gate. The entrance communicates with a food-preparing device of the food vending machine; the at least one serving opening is formed on a front surface of the case; the at least one gate selectively close the at least one serving opening. The transmission mechanism is disposed in the case and comprising at least one belt and a plurality of loading assemblies. The at least one belt defines a transmission route, and the transmission route extends along the at least one belt and adjacent to an inner side of each one of the at least one serving opening; the loading assemblies are connected with the at least one belt and are capable of moving along the transmission route. The driving mechanism is connected with the at least one belt and driving the at least one belt to rotate.

The food vending machine has a food-preparing device and the aforesaid storage device. The food-preparing device comprises a plurality of food-out openings, and the food-out openings arranged on different surfaces of the food-preparing device. The entrance of the storage device communicates with one of the food-out openings of the food-preparing device.

The food-serving method includes processes in sequence as follows: a meal ordering process, a preparing process, and a meal serving process. The meal ordering process includes choosing a meal and making payment by a consumer, and the consumer selecting an option of later pick-up and specifying a pick-up time. In the preparing process, wherein when the consumer selects the option of later pick-up and specifies the pick-up time, the food-preparing device of the aforesaid food vending machine will prepare a meal when the pick-up time is approaching. In the meal serving process, when the consumer selects the option of later pick-up and specifies the pick-up time, the meal will be conveyed immediately to one of the food-out openings of the food vending machine when the meal is made ready; and then when a staying time of the meal staying in the food-out opening is within a pre-set waiting time, the food-out opening will open after verifying an identity of the consumer; or when the staying time of the meal staying in the food-out opening exceeds the pre-set waiting time, the meal will be conveyed to the storage device of the food vending machine; and after the identity of the consumer is verified, the meal is conveyed to one of the at least one serving opening of the storage device, and said serving opening is opened.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
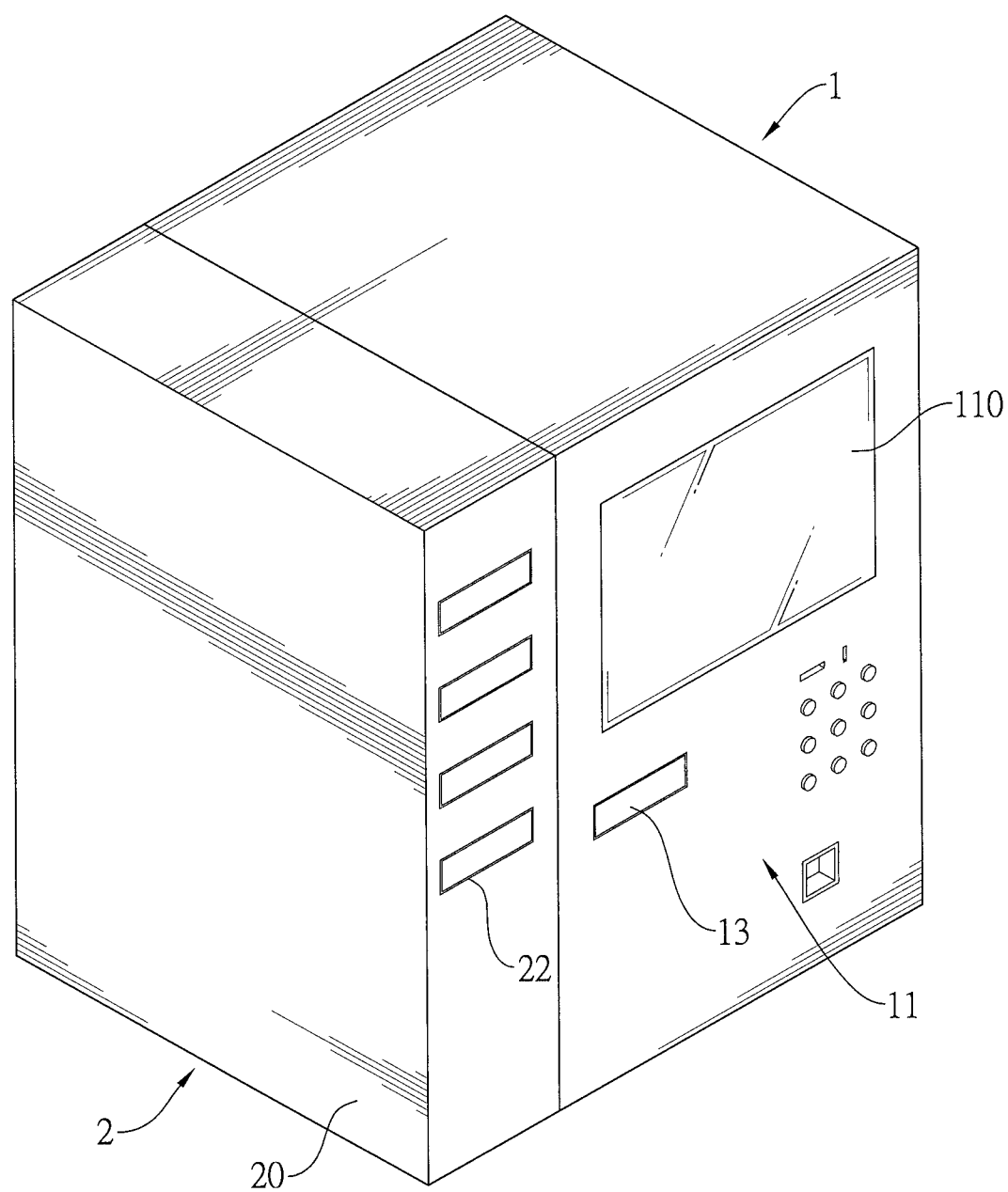
FIG. 1 is a perspective view of a food vending machine in accordance with the present invention.
Figure 2:
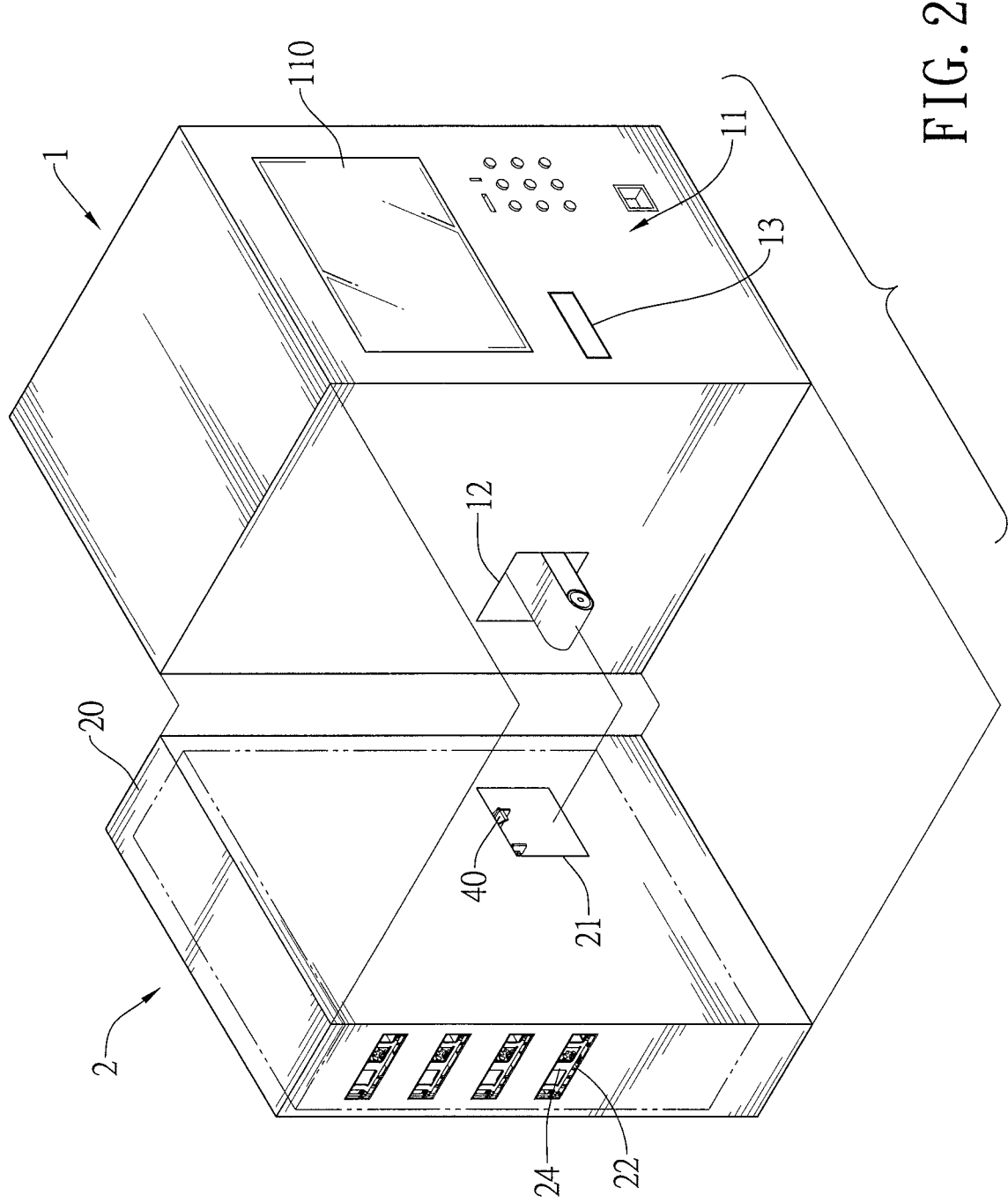
FIG. 2 is an exploded perspective view of the food vending machine in FIG. 1.

With reference to FIGS. 1 and 2, a food vending machine in accordance with the present invention comprises a food-preparing device 1 and a storage device 2. The food-preparing device 1 is capable of cooking food and preparing a meal according to a consumer's order, and then putting the meal in a container. The food-preparing device 1 comprises an operation interface 11 and at least one food-out opening. The operation interface 11 is on a front surface of the food-preparing device 1 and comprises a viewing window and/or a screen 110; consumers can observe a preparing process of the meal through the viewing window; introductions of meals or advertisement can be broadcasted by the screen 110. A number of the at least one food-out opening is two, including a first food-out opening 12 and a second food-out opening 13. The first food-out opening 12 is connected with the storage device 2 and is on one surface of the food-preparing device 1. The second food-out opening 13 is on one surface of the food-preparing device 1, e.g. on the front surface of the food-preparing device 1 and thereby the prepared meal can be provided to the consumer via the second food-out opening 13.

Then please refer to FIG. 3 to FIG. 6. The storage device 2 comprises a case 20, a transmission mechanism 30, a securing mechanism 40, and a driving mechanism 50.

The case 20 comprises an entrance 21, at least one serving opening 22 (as shown in FIG. 2), two tracks 23, and at least one gate 24. In this embodiment, numbers of the at least one serving opening 22 and the at least one gate 24 are pluralities, and the numbers of the serving openings 22 and the gates 24 are the same.

The entrance 21 of the case 20 communicates with the first food-out opening 12 of the food-preparing device 1 (as shown in FIG. 2), which allows a meal A to be conveyed into the storage device 2 with the container through the first food-out opening 12 and the entrance 21 after said meal A is made ready by the food-preparing device 1. The serving openings 22 are formed on a front surface of the case 20 and each one of the serving openings 22 is mounted with a sensor 25. The two tracks 23 are parallel and spaced apart from each other, and the two tracks 23 are mounted adjacent to two sides of the serving openings 22 respectively. In other words, in this embodiment, the tracks 23 extend, and pass by or adjacent an inner side of each one of serving openings 22.

The gates 24 respectively correspond to the serving openings 22 in location, so that each one of the gates 24 selectively closes a respective one of the serving openings 22. In this embodiment, each gate 24 comprises a plate 241, at least one engaging portion 242, a connecting element 243, a rotating element 244, and a board 245.

Two ends of the plate 241 are movably connected with the two tracks 23 and specifically, the two ends of the plate 241 are sleeved on the two tracks 23 so that the plate 241 can move along the two tracks 23. In this embodiment, a number of the at least one engaging portion 242 is two. The two engaging portions 242 are securely mounted on the two ends of plate 241 respectively, and each one of the engaging portions 242 comprises a positioning rod 2421 and a conical block 2422. The positioning rod 2421 is L-shaped and comprises a vertical end and a horizontal end. The vertical end is securely mounted on the plate 241 and the conical block 2422 is securely mounted on the horizontal end, so that the conical block 2422 is positioned lower than the plate 241. In another embodiment, the positioning rod 2421 is U-shaped, and an end of the positioning rod 2421 connected with the conical block 2422 is shorter than another end of the positioning rod 2421 connected with the plate 241. The conical block 2422 is tapered at an upper end.

One end of the connecting element 243 is securely mounted on the plate 241, and a side of the connecting element 243 is connected with the rotating element 244. In this embodiment, the rotating element 244 may comprise a motor 2441 and a gear 2442; the connecting element 243 may be a rack engaged with the gear 2442. In another embodiment, the rotating element 244 may comprise a motor and a wheel; the connecting element is a connecting belt wound on the wheel. Thus, when the rotating element 244 is rotated, the rotating element 244 can drive the connecting element 243 to move, and then the connecting element 243 drives the plate 241 to move along the two tracks 23 upward or downward, which causes the gates 24 to open or close the serving openings 22.

The board 245 is securely mounted beyond the rotating element 244 to restrict a movement range of the container accommodating the meal A and prevent the container from being overturned when the consumer picks up the container.

In another embodiment, the case may only comprise one track, the track is adjacent to the serving openings, and the plates are connected with the track and are capable of moving along the track. In still another embodiment, the case may comprise multiple pairs of tracks, and each pair of tracks are parallel, are spaced apart from each other, and are mounted adjacent to two sides of one of the serving openings; each one of the plates corresponds to a respective one pair of the tracks in location.

The transmission mechanism 30 is disposed in the case 20 and comprises at least one belt 31 and a plurality of loading assemblies 32. In this embodiment, each one of the at least one belt 31 is a chain, and the number of the at least one belt 31 is two, but it is not limited thereto. The two belts 31 are parallel and spaced apart from each other. The belts 31 define a transmission route and the transmission route extends along the belts 31 and passes by the inner side of each one of the serving openings 22.

Specifically, the transmission route includes a plurality of straight segments 311 and a plurality of turning segments 312. The straight segments 311 extend horizontally and are parallel and spaced apart from each other, but, in another embodiment, the straight segments 311 may extend obliquely or vertically. Two ends of each one of the turning segments 312 are connected to two of the straight segments 311 respectively. The inner side of each one of the serving openings 22 corresponds in position to one of the turning segments 312. Thus, the belts 31 and the transmission route extend in an S-shape behind the serving openings 22 and thereby an efficiency of space utilization is improved so that more loading assemblies 32 can be put in the transmission mechanism 30. In another embodiment, each one of the serving openings may correspond to a respective one of the straight segments as well.

Figure 7:
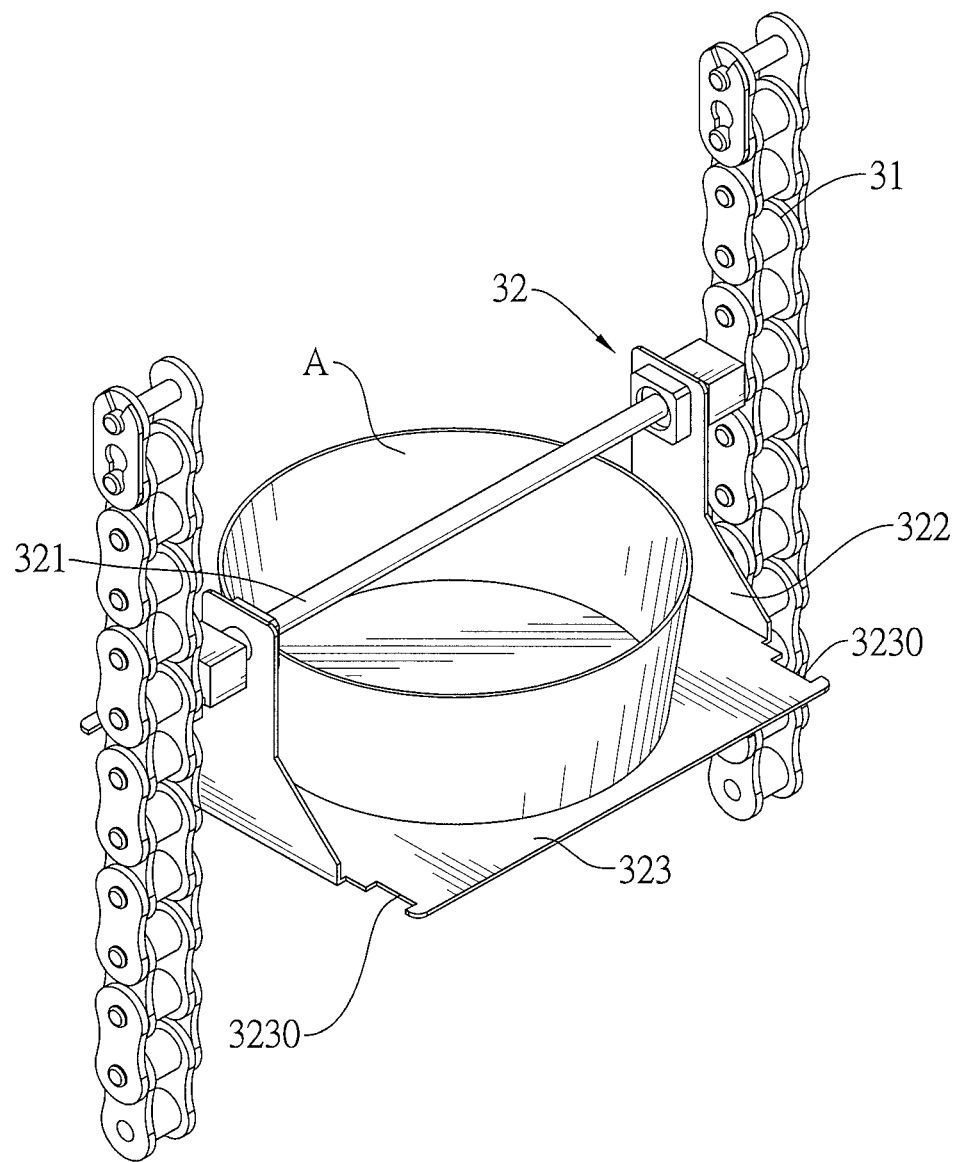
FIG. 7 is a perspective view of a loading assembly of the transmission mechanism in FIG. 1.

Please also refer to FIG. 7. Each one of loading assembles 32 is connected to the belts 31, and can be moved along the transmission route. Specifically, each one of the loading assemblies 32 is disposed between the two belts 31 and comprises a connecting rod 321, two hanging racks 322, and a carrier seat 323. Two ends of the connecting rod 321 are securely mounted on the two belts 31 respectively. For example, when the belts 31 are chains, the two ends of the connecting rod 321 are mounted on corresponding nodes of the chains respectively. Upper ends of the two hanging racks 322 are pivotably mounted on the connecting rod 321, and two ends of the carrier seat 323 are securely mounted on lower ends of the two hanging racks 322 respectively. Therefore, with the pivotable hanging racks 322, the carrier seat 323 is kept under the connecting rod 321 wherever the loading assembly 32 is moved along the transmission route on the belts 31.

Figure 8:
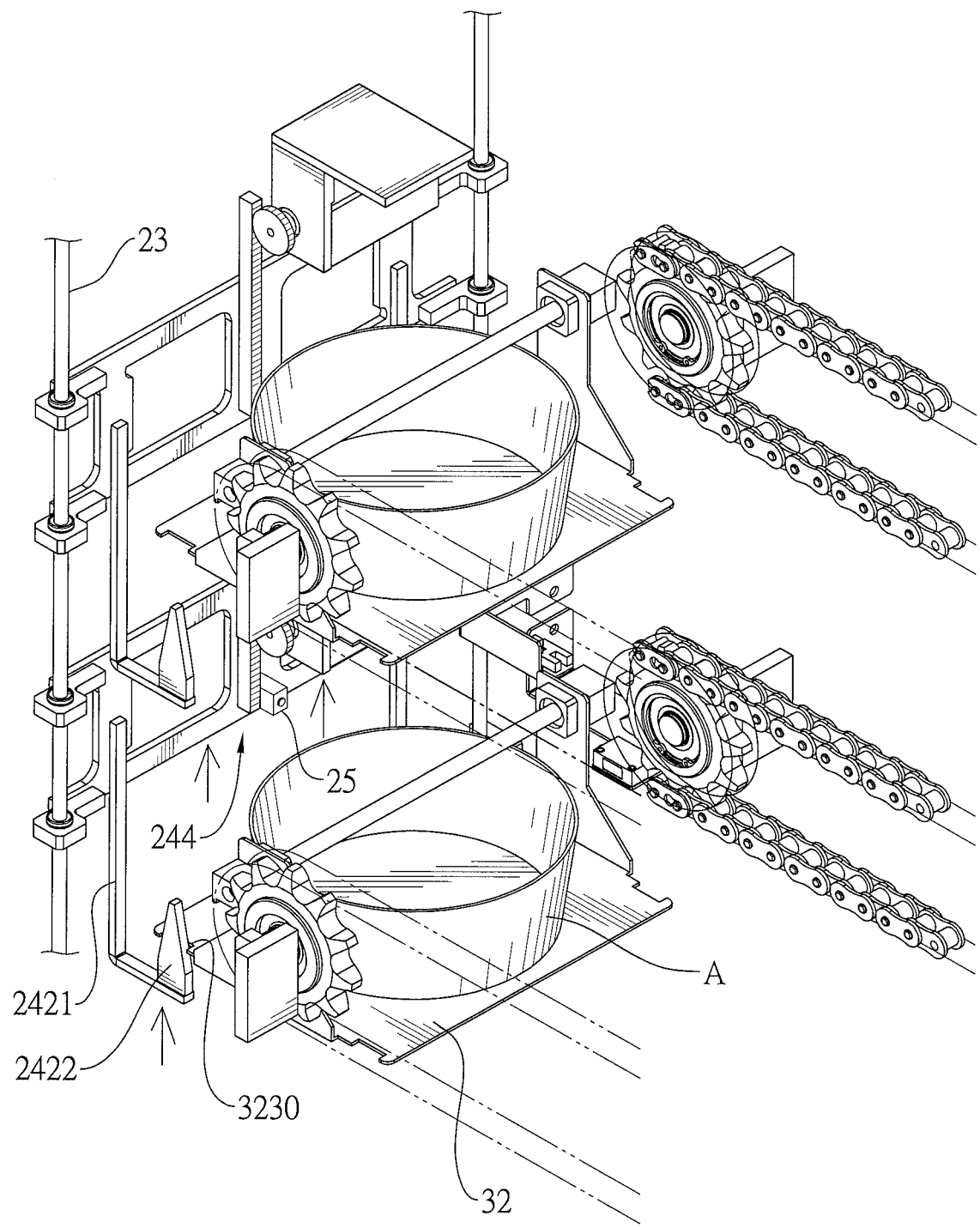
FIG. 8 is a perspective view of the transmission mechanism of the storage device in FIG. 1, shown with one of the serving openings being opened.

The carrier seat 323 may be a board and forms at least one fixing opening 3230, and in this embodiment, the at least one fixing opening 3230 is two fixing openings 3230. The fixing openings 3230 are on edges of two sides of the carrier seat 323. The conical blocks 2422 of the two engaging portions 242 of the plate 241 are selectively mounted through and engaged in the two fixing openings 3230 (as shown in FIG. 8), so that when the plate 241 moves up and the at least one gate 24 is opened, the conical blocks 2422 move up with the plate 241 and fix the carrier seat 323, which prevents the loading assembly 32 from swaying.

The sensor 25 of each one of the serving openings 22 is mounted on an inner surface of the plate 241, and the sensor 25 is an image sensor (e.g. Charge Coupled Device, CCD) for monitoring the loading assembly 32. Specifically, the sensor 25 can detect whether the loading assembly 32 moved behind the serving opening 22 carries a meal A to make sure the serving is correct, or detect that the consumer's hand is placed in the serving opening 22 and keep the gate 24 open for avoiding clamping the consumer's hand.

Figure 3:
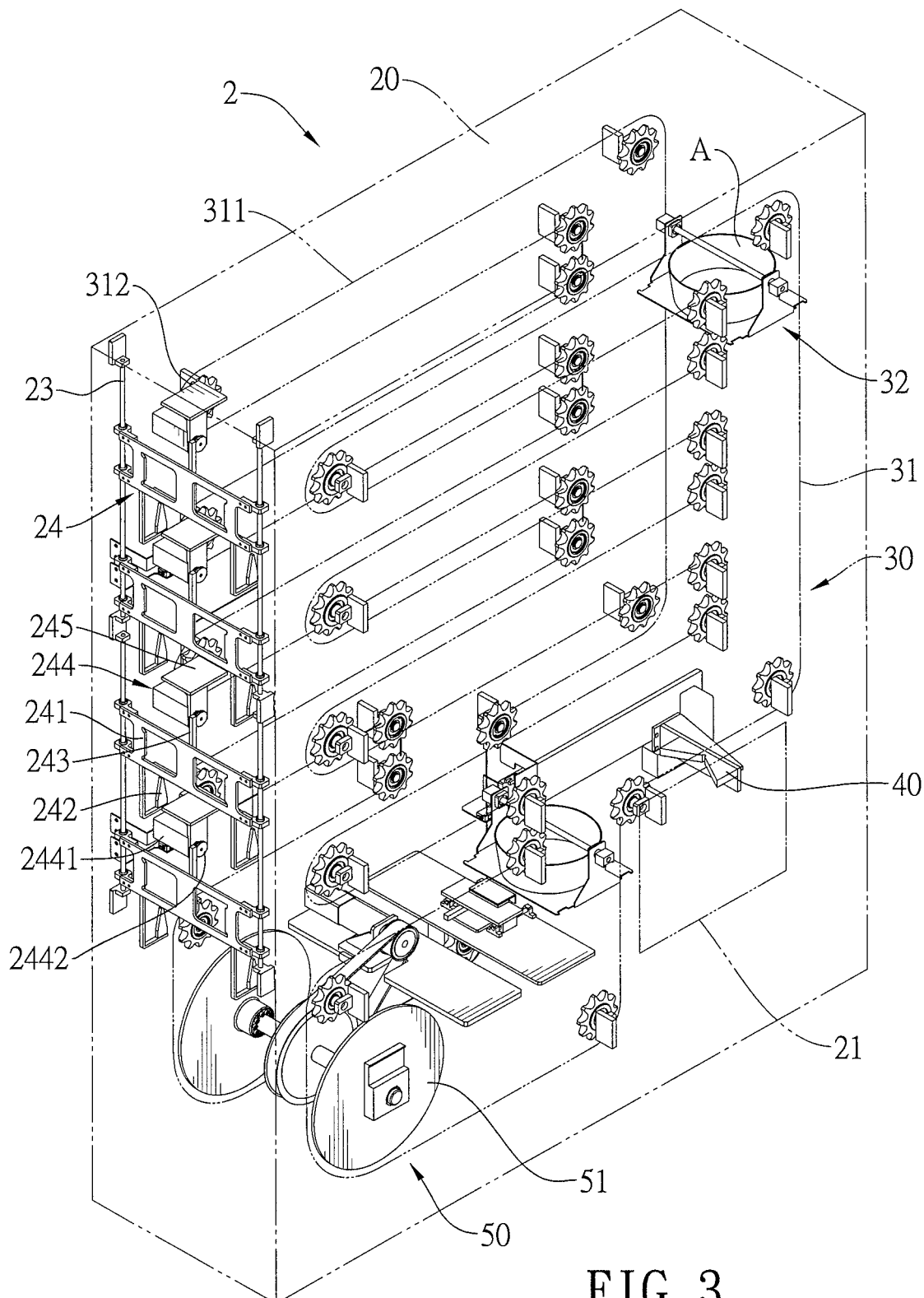
FIG. 3 is a perspective view of a storage device of the food vending machine in FIG. 1.
Figure 4:
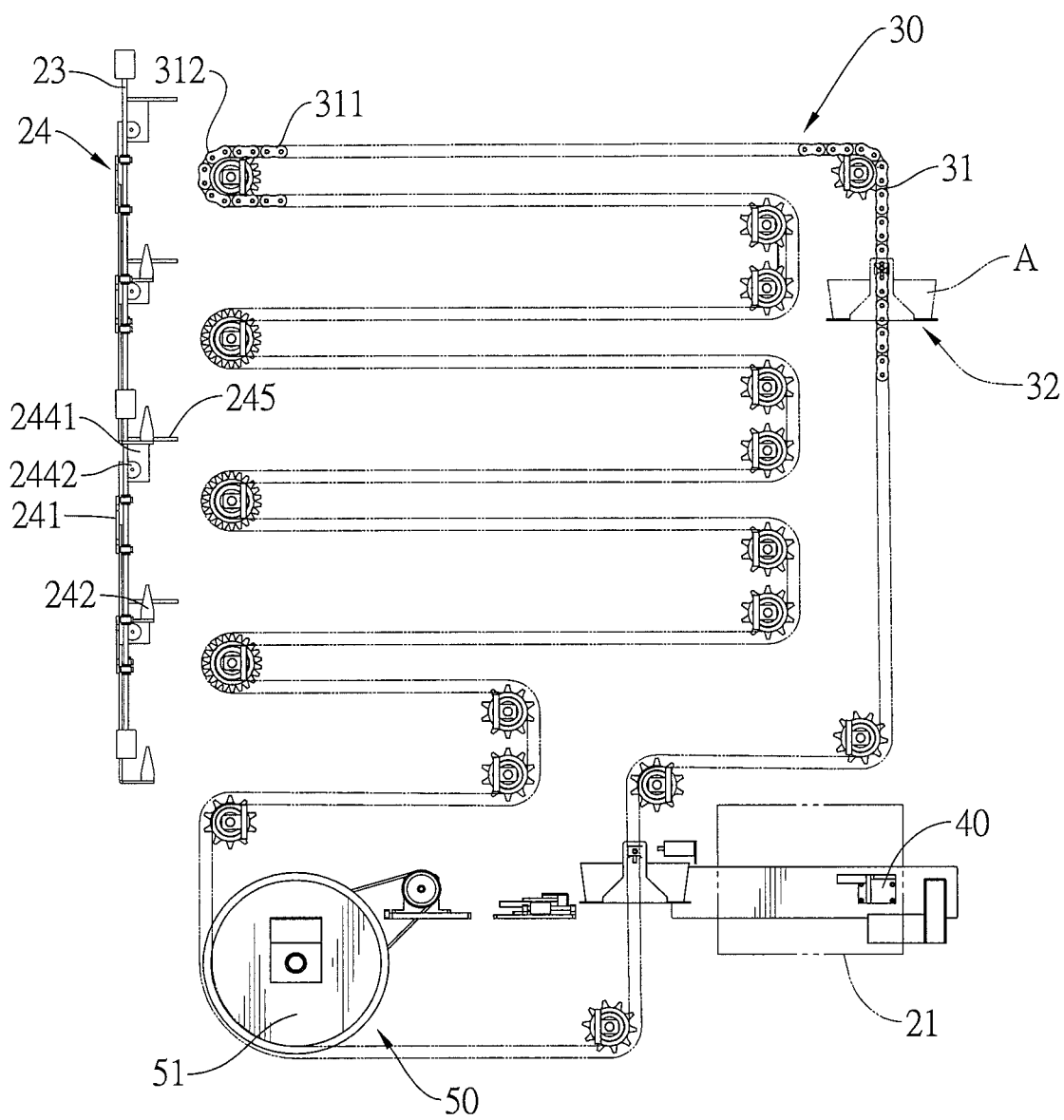
FIG. 4 is a schematic view of the storage device of the food vending machine in FIG. 1.
Figure 5:
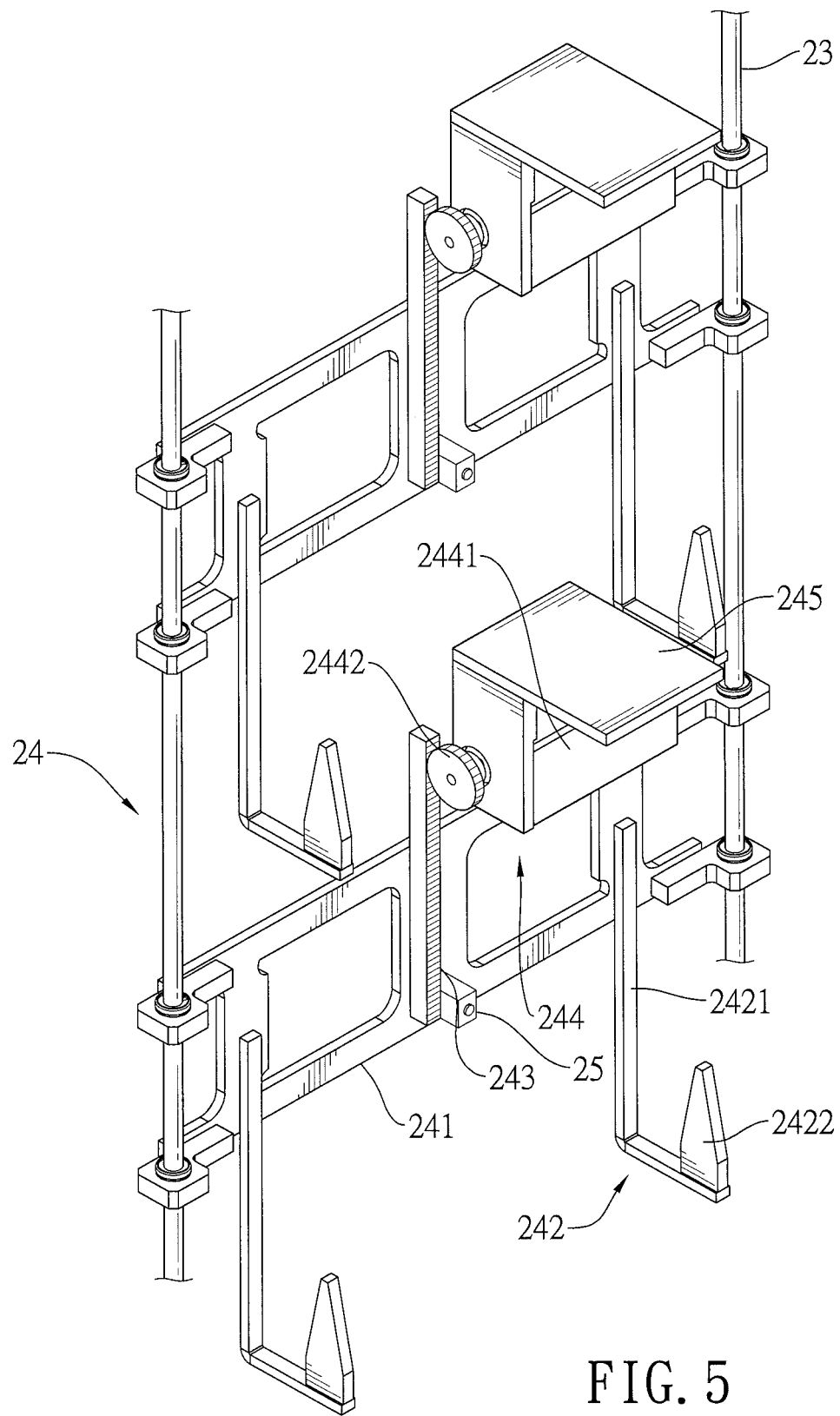
FIG. 5 is a perspective view of serving openings and gates of the storage device in FIG. 1.

Please refer to FIG. 2 to FIG. 4. The securing mechanism 40 is disposed adjacent to the transmission route, and the entrance 21 is disposed to face to the securing mechanism 40. The securing mechanism 40 comprises a clamp component. When a meal A is made ready for serving by the food-preparing device 1 and conveyed into the storage device 2 with a container through the first food-out opening 12 of the food-preparing device 1 and the entrance 21 of the storage device 2, the clamp component of the securing mechanism 40 takes the meal A and puts the meal A on a center of the carrier seat 323 of one of the loading assemblies 32 and prevents the meal A from being overturned.

The driving mechanism 50 is connected with the belts 31 to drive the belts 31 to rotate, and in this embodiment, the driving mechanism 50 can drive the belts 31 to rotate along a forward direction and a backward direction. In this embodiment, the driving mechanism 50 comprises a motor (not shown in the drawings) and two sprockets 51 connecting the motor and the belts 31, and thus the belts 31 are driven.

The storage device 2 further comprises a temperature controlling component (not shown in the drawings) for adjusting the temperature in the case 20, so that the temperature is suitable for preserving the meals A in the case 20. For example, if the meals A are hot foods, such bentos or noodles with soup, the temperature controlling component may be a heater or electric heat pipe; if the meals A are cold foods, the temperature controlling component may be a refrigerator.

Figure 10:
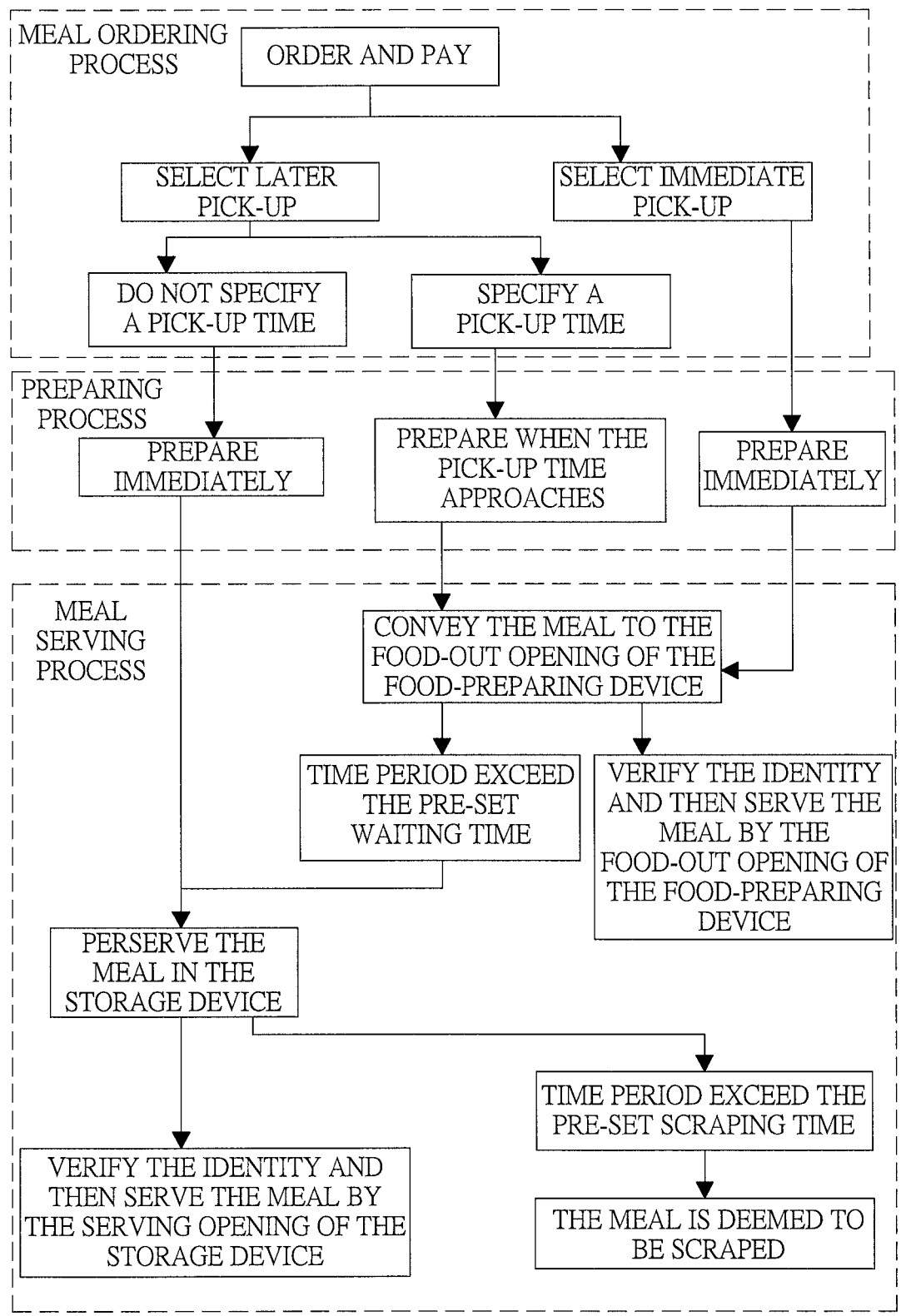
FIG. 10 is a flow chart of a food-serving method in accordance with the present invention.

The please refer to FIGS. 1 and 10. With the aforesaid food vending machine, consumers can purchase a preferred meal through a food-serving method including a meal ordering process, a preparing process, and a meal serving process in serial.

In the meal ordering process, a consumer can get information about every meal, e.g. ingredients or nutrient facts of the meal, via a website, a mobile app, or an operation interface 11 of the aforesaid food vending machine; then the consumer can choose and order a meal and pay via the website, the mobile app, or the operation interface 11. Besides, when the consumer chooses a meal, the consumer can select an option of immediate pick-up or an option of later pick-up.

If the consumer selects the option of immediate pick-up, the meal will be served by the food-preparing device 1 after the meal is made ready. If the consumer selects the options of later pick-up, the consumer can further specify a pick-up time optionally. If the consumer does not specify a pick-up time, the food vending machine will immediately begin the subsequent preparing process and the meal serving process after the consumer makes the payment, and then the prepared meal will be preserved in the storage device 2 until picked up by the consumer. If the consumer specifies a pick-up time, the food vending machine will begin the subsequent preparing process and the meal serving process when the specified pick-up time approaches and the prepared meal will be served by the food-preparing device 1 directly.

The subsequent processes are described in the condition that the consumer selects later pick-up and does not specify a pick-up time.

In the preparing process: after the consumer orders a meal and pays, the food-preparing device 1 of the food vending machine begins to prepare the meal.

In the meal serving process: the prepared meal is preserved in the storage device 2 of the food vending machine. Then, when the consumer wants to pick up the meal, after an identity of the consumer is verified, the meal is conveyed to one of the serving openings 22 of the storage device 2, and said serving opening 22 is opened.

When a time period of the meal being preserved in the storage device 2 exceeds a pre-set scraping time, the meal is deemed to be scrapped and not to be served, which ensures every served meal is fresh and suitable for eating. Said pre-set scraping time is a first scraping time. In addition, as the food vending machine is capable of providing many different meals and the storage device 2 is capable of preserving a plurality of meals, in this embodiment, when multiple meals are preserved, the meal served by the storage device 2 is the same meal made ready earliest, instead of the meal prepared at the time of order.

Therefore, if a former consumer orders a meal but does not pick up the meal on time and a later consumer orders a same meal, the later consumer can pick up the meal prepared at a time when the former consumer places the order, so that the meal may not be deemed to be scrapped. Likewise, when the former consumer comes back and wants to pick up the meal, the meal prepared at a time when the later consumer places the order may be served, which may reduce the chance that the meal is deemed to be scrapped such that a consumer cannot pick up a meal. In other words, in the present food-serving method, the earliest prepared meal is first served.

Then please also refer to FIG. 4. On the other hand, with a plurality of serving openings 22 of the storage device 2 and the driving mechanism 50 being capable of driving the belts 31 to rotate forward and backward, in the meal serving process, the meal A may be conveyed to the nearest serving opening 22 along the transmission route, rather than conveyed via almost a whole circle of the transmission route before arriving at the serving opening 22, so that a waiting time of a consumer is reduced.

Figure 6:
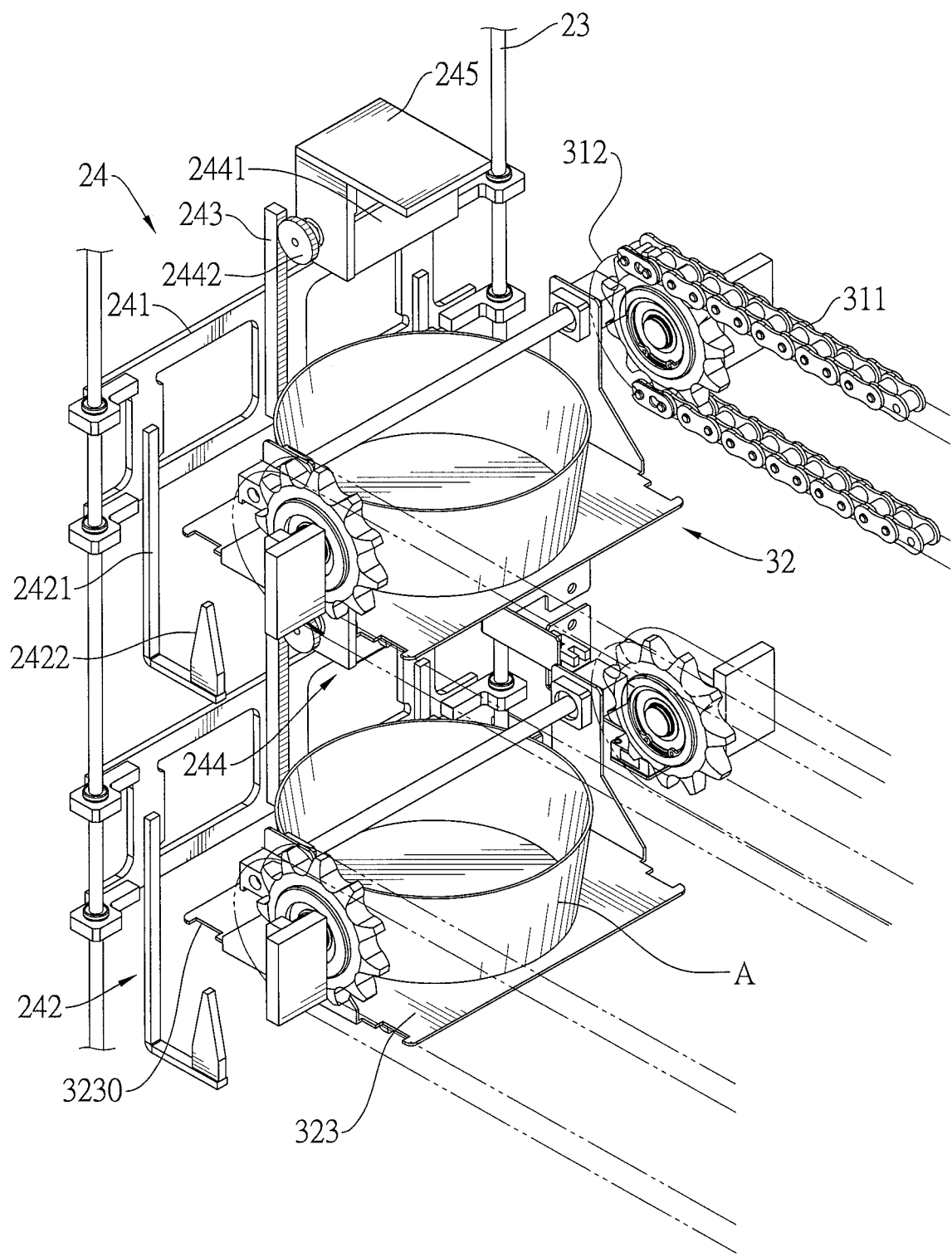
FIG. 6 a perspective view of a transmission mechanism of the storage device in FIG. 1, shown with the serving openings closed.
Figure 9:
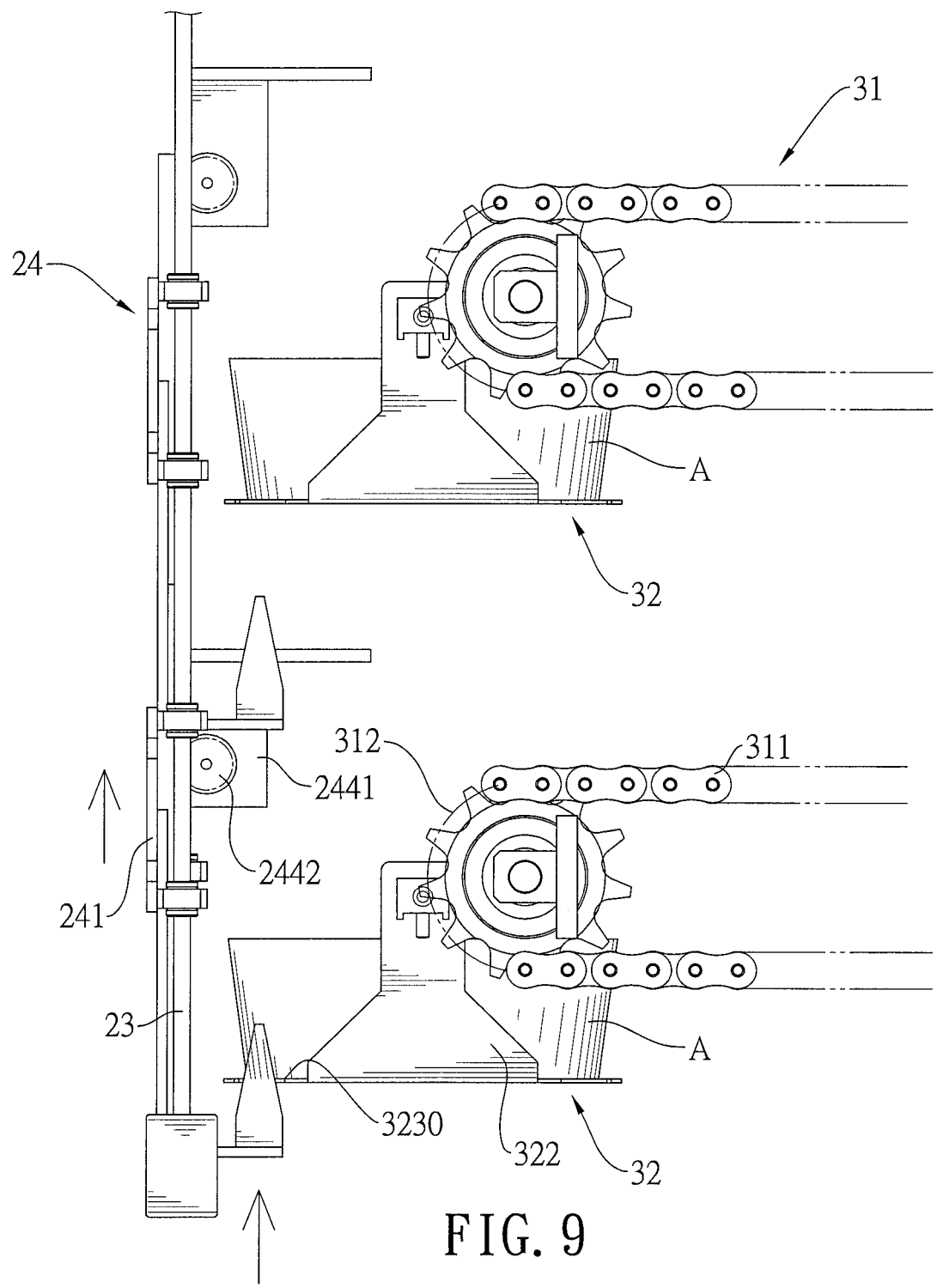
FIG. 9 a lateral perspective view of the transmission mechanism of the storage device in FIG. 1, shown with one of the serving openings being opened.

Then please also refer to FIGS. 6, 8, and 9. After the meal A is conveyed to the serving opening 22, the rotating element 244 drives the plate 241 to move upward and the serving opening 22 is opened. When the plate 241 moves upward, the engaging portions 242 engage in the fixing openings 3230 of the carrier seat 323. Thus, the loading assembly 32 is fixed and will not sway so the consumer can take the meal A from the carrier seat 323 through the serving opening 22, and the meal A may not be overturned during pick-up because of the swaying carrier seat 323. Then, after the consumer picks up the meal A and the sensor 25 confirms that there is no meal A on the loading assembly 32, the sensor 25 transmits a signal, the gate 24 closes the serving opening 22, and then the next meal serving process is performed subsequently.

The subsequent processes are described in the condition that the consumer selects later pick-up and specifies a pick-up time.

In the preparing process: when the pick-up time approaches, the food-preparing device 1 prepares a meal.

In the meal serving process: the meal is conveyed to the second food-out opening 13 of the food-preparing device 1 after made ready, and then the food-out opening 13 is opened for pick-up after the identity of the consumer is verified. If a time period in which the meal being placed in the food-out opening 13 exceeds a pre-set waiting time and the consumer still does not pick up the meal yet, the meal is conveyed to the storage device 2. Subsequent steps of the meal serving process are the same with the aforesaid meal serving process which is in the conditions that later pick-up is selected and a pick-up time is specified, so detailed descriptions thereof would be omitted. However, because the meal is put in the food-preparing device 1 for a while, the meal will be deemed to be scrapped if a time period of the meal preserved in the storage device 2 exceeds a second scraping time shorter than the first scraping time. Specifically, the second scraping time is the maximum time period of the meal preserved in the storage device 2, and the second scraping time may equal the first scraping time deducting the waiting time.

After all, the subsequent processes are described in the condition that the consumer selects immediate pick-up.

In the preparing process: after the consumer orders and pays, the food-preparing device 1 of the food vending machine prepares a meal immediately.

In the meal serving process: subsequent steps are the same with the aforesaid meal serving process which is in the conditions that the consumer selects later pick-up and specifies a pick-up time, so detailed descriptions thereof would be omitted.

In another embodiment, the food-serving method may be performed by a food vending machine with a storage device for preserving meals rather than the aforesaid food vending machine.

Consequently, with the storage device 2, meals produced by the food vending machine can be preserved and the consumer can pick up the meal at any time. Besides, the consumer can select the options of immediate pick-up, or later pick-up and specify a pick-up time further. In addition, when serving the meal, if the consumer does not pick up the meal within the waiting time, the served meal taken back can be preserved in the storage device 2. Therefore, the present invention reduces the waiting time, the consumer can order remotely or utilize time before the meal is served, and the meal not picked up on time may not interfere with later consumers.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A storage device for a food vending machine connected with a food-preparing device of the food vending machine, the storage device comprising:
   a case comprising:
      an entrance communicating with the food-preparing device;
      at least one serving opening formed on a front surface of the case; and
      at least one gate selectively closing the at least one serving opening;
   a transmission mechanism disposed in the case and comprising:
      two belts parallel and spaced apart from each other, and the two belts defining:
         a transmission route extending along the two belts and adjacent to an inner side of each one of the at least one serving opening; and
      a plurality of loading assemblies connected with the two belts, located between the two belts, and being capable of moving along the transmission route; each one of the loading assemblies comprising:
         a connecting rod, two ends of the connecting rod securely mounted on the two belts respectively;
         two hanging racks, an upper end of each one of the hanging racks pivotably mounted on the connecting rod; and
         a carrier seat, two ends of the carrier seat securely mounted on lower ends of the two hanging racks respectively; and
   a driving mechanism connected with the two belts and driving the two belts to rotate.

2. The storage device for a food vending machine as claimed in claim 1, wherein:
   each one of the loading assemblies forms at least one fixing opening; and
   the at least one gate of the case comprises:
      at least one engaging portion selectively engaged in the at least one fixing opening.

3. The storage device for a food vending machine as claimed in claim 1, wherein:
   the case further comprises:
      at least one track mounted beside the at least one serving opening; and
   each one of the at least one gate of the case comprises:
      a plate, at least one end of the plate movably connected with the at least one track;
      a rotating element;
      a connecting element, one end of the connecting element securely mounted on the plate and one side surface of the connecting element connected with the rotating element;
   wherein when the rotating element is rotated, the rotating element drives the connecting element to move, and the connecting element drives the plate to move along the at least one track.

4. The storage device for a food vending machine as claimed in claim 2, wherein:
   the case further comprises:
      at least one track mounted beside the at least one serving opening; and
   each one of the at least one gate of the case comprises:
      a plate, at least one end of the plate movably connected with the at least one track;
      a rotating element;
      a connecting element, one end of the connecting element securely mounted on the plate and one side surface of the connecting element connected with the rotating element;

wherein when the rotating element is rotated, the rotating element drives the connecting element to move, and the connecting element drives the plate to move along the at least one track.

5. The storage device for a food vending machine as claimed in claim 4, wherein the transmission route comprises:
a plurality of straight segments; and
a plurality of turning segments, each one of the turning segments connected with and located between two of the straight segments, and the inner side of each one of the at least one serving opening adjacent to a respective one of the turning segments.

6. The storage device for a food vending machine as claimed in claim 5, wherein
the at least one serving opening comprises multiple serving openings; each one of the serving openings corresponds in position to a respective one of the turning segments; and
the at least one gate comprises multiple gates; each one of the gates corresponds in position to a respective one of the serving openings.

7. The storage device for a food vending machine as claimed in claim 6, wherein each one of the serving openings comprises:
a sensor for monitoring the loading assemblies.

8. The storage device for a food vending machine as claimed in claim 1, wherein each one of the at least one serving opening is mounted with:
a sensor for monitoring the loading assemblies.

9. A food vending machine comprising:
a food-preparing device comprising a plurality of food-out openings, the food-out openings arranged on different surfaces of the food-preparing device; and
the storage device as claimed in claim 1, the entrance of the storage device communicating with one of the food-out openings of the food-preparing device.

10. A storage device for a food vending machine connected with a food-preparing device of the food vending machine, the storage device comprising:
a case comprising:
an entrance communicating with the food-preparing device;
at least one serving opening formed on a front surface of the case; and
at least one gate selectively closing the at least one serving opening;
a transmission mechanism disposed in the case and comprising:
at least one belt defining:
a transmission route extending along the at least one belt and adjacent to an inner side of each one of the at least one serving opening; and
a plurality of loading assemblies connected with the at least one belt and being capable of moving along the transmission route; and
a driving mechanism connected with the at least one belt and driving the at least one belt to rotate;
wherein the transmission route comprises:
a plurality of straight segments; and
a plurality of turning segments, each one of the turning segments connected with and located between two of the straight segments, and the inner side of each one of the at least one serving opening adjacent to a respective one of the turning segments.

11. The storage device for a food vending machine as claimed in claim 10, wherein:
the at least one serving opening comprises multiple serving openings; each one of the serving openings corresponds in position to a respective one of the turning segments; and
the at least one gate comprises multiple gates; each one of the gates corresponds in position to a respective one of the serving openings.

12. A food-serving method including processes in sequence as follows:
a meal ordering process including:
choosing a meal and making payment by a consumer, and the consumer selecting an option of later pick-up and specifying a pick-up time;
a preparing process, wherein:
when the consumer selects the option of later pick-up and specifies the pick-up time, a food-preparing device of a food vending machine will prepare a meal when the pick-up time is approaching; wherein:
said food vending machine comprises:
said food-preparing device comprising a plurality of food-out openings, the food-out openings arranged on different surfaces of the food-preparing device; and
a storage device connected with the food-preparing device and comprising:
a case comprising:
an entrance communicating with one of the food-out openings;
at least one serving opening formed on a front surface of the case; and
at least one gate selectively closing the at least one serving opening;
a transmission mechanism disposed in the case and comprising:
at least one belt defining:
a transmission route extending along the at least one belt and adjacent to an inner side of each one of the at least one serving opening; and
a plurality of loading assemblies connected with the at least one belt and being capable of moving along the transmission route; and
a driving mechanism connected with the at least one belt and driving the at least one belt to rotate;
a meal serving process, wherein:
when the consumer selects the option of later pick-up and specifies the pick-up time, the meal will be conveyed immediately to one of the food-out openings of the food vending machine when the meal is made ready; and
when a staying time of the meal staying in the food-out opening is within a pre-set waiting time, the food-out opening will open after verifying an identity of the consumer; or
when the staying time of the meal staying in the food-out opening exceeds the pre-set waiting time, the meal will be conveyed to the storage device of the food vending machine; and after the identity of the consumer is verified, the meal is conveyed to one of the at least one serving opening of the storage device, and said serving opening is opened.

13. The food-serving method as claimed in claim 12, wherein:
when the meal ordering process is performed, the consumer is capable of selecting the option of later pick-up without specifying the pick-up time;

during the preparing process, when the consumer selects the option of later pick-up without specifying the pick-up time, the food-preparing device of the food vending machine prepares a meal immediately; and during the meal serving process, when the consumer selects the option of later pick-up without specifying the pick-up time, the meal is stored in the storage device of the food vending machine after made ready; and after the identity of the consumer is verified, the meal will be conveyed to one of the at least one serving opening of the storage device, and said serving opening is opened.

14. The food-serving method as claimed in claim 12, wherein during the meal serving process, if a plurality of meals is stored in the storage device, an earliest prepared meal will be first served when said meal is served by the storage device.

15. The food-serving method as claimed in claim 12, wherein when the meal serving process is preformed, a meal will not be served if a time period of said meal staying in the storage device exceeds a pre-set scraping time.

16. The food-serving method as claimed in claim 12, wherein when the meal ordering process is preformed, the consumer can order via a website, a mobile application, or an operation interface of the food vending machine.

17. The food-serving method as claimed in claim 12, wherein when the meal ordering process is preformed, the consumer is capable of selecting an option of immediate pick-up; and, if the consumer selects the option of immediate pick-up, when the preparing process is performed, a meal will be prepared immediately by the food-preparing device of the food vending machine; and when the meal serving process is performed, said meal is conveyed to a position behind one of the food-out openings of the food vending machine; then if a staying time of said meal staying behind said food-out opening is within the pre-set waiting time, said food-out opening will open after verifying the identity of the consumer; and if a staying time of said meal staying behind the food-out opening exceeds the pre-set waiting time, said meal is conveyed to the storage device of the food vending machine, and after the identity of the consumer is verified, the meal is conveyed to one of the at least one serving opening of the storage device, and said serving opening is opened.

18. The food-serving method as claimed in claim 12, wherein:

the storage device comprises a plurality of serving openings and a transmission route, and the transmission route passes to the inner sides of the serving openings; and when the meal serving process is performed, the meal in the storage device is conveyed to a nearest serving opening along the transmission route and served.

* * * * *